United States Patent [19]
Schluenz

[11] Patent Number: 5,959,010
[45] Date of Patent: Sep. 28, 1999

[54] PARTICLEIZED RESIN HAVING IMPROVED PROPERTIES AND METHOD OF PRODUCING SAME

[75] Inventor: Robert W. Schluenz, Panama City, Fla.

[73] Assignee: Arizona Chemical Company, Panama City, Fla.

[21] Appl. No.: 08/846,634

[22] Filed: Apr. 30, 1997

[51] Int. Cl.$^6$ .............................. C08L 93/04; C08L 93/00; C08L 45/00
[52] U.S. Cl. .......................... 524/274; 264/140; 525/210; 525/211; 525/216
[58] Field of Search ............................ 524/274; 525/210, 525/211, 216; 264/140

[56] References Cited

U.S. PATENT DOCUMENTS

| | | | |
|---|---|---|---|
| 1,931,226 | 1/1933 | Humphrey | 87/2 |
| 2,042,877 | 6/1936 | Borglin | 87/2 |
| 2,556,247 | 6/1951 | Zeigler et al. | 18/15 |
| 2,894,925 | 7/1959 | Morris et al. | 525/216 |
| 3,367,998 | 2/1968 | Osterrieth et al. | 525/210 |
| 3,491,177 | 1/1970 | Johnson | 264/143 |
| 3,669,722 | 6/1972 | Bishop | 117/100 |
| 3,927,166 | 12/1975 | Tomoda et al. | 264/144 |
| 4,081,502 | 3/1978 | Blumel et al. | 264/140 |
| 4,389,357 | 6/1983 | Chu et al. | 264/40.1 |
| 4,622,193 | 11/1986 | Kresge et al. | 264/141 |
| 5,108,680 | 4/1992 | Menting et al. | 264/140 |
| 5,387,630 | 2/1995 | Edwards et al. | 524/274 |

OTHER PUBLICATIONS

*Hawley's Condensed Chemical Dictionary*, Twelfth Ed., Revised by Richard J. Lewis, Sr., p. 933, Van Nostrand Reinhold Co., NY.

*Aldrich Catalog Handbook of Fine Chemicals, 1994–1995*, p. 1163, Milwaukee, WI, USA.

*Primary Examiner*—Peter A. Szekely
*Attorney, Agent, or Firm*—Luedeka, Neely & Graham, P.C.

[57] ABSTRACT

Reduction of dust formation for particleized resin is achieved by adding low density high molecular weight polyethylene to molten resin at a temperature and under conditions sufficient to cause the polyethylene to become dispersed within the resin. The resin/polyethylene mixture is then formed into solid particles. The addition of low density, high molecular weight polyethylene significantly reduces the generation of dust during handling, such as in the particleizing and packaging stages of the manufacturing process, while providing resin particles with higher effective softening points as compared to resin particles augmented with polyethylene wax.

15 Claims, No Drawings

PARTICLEIZED RESIN HAVING IMPROVED PROPERTIES AND METHOD OF PRODUCING SAME

The present invention relates to resins such as rosin, rosin esters, terpene resins and similar compositions and methods for their manufacture. More particularly, the invention relates to particleized resin compositions having improved properties and to an improved method of making particleized resin.

Rosin, rosin esters, terpene resins and modified forms thereof (hereinafter sometimes referred to collectively as "resin" or "resins") are commercially valuable compositions widely used as ingredients in a variety of materials including adhesives, sealants, varnishes, sizing, and inks, to name a few. It is often desirable to prepare these resins in particleized form such as flakes or pellets for ease of handling and storage.

One problem associated with particleized resin is dust, particularly in the case of resins having relatively high softening points, such as above about 100° C. (212° F.), and especially those having softening points of 120° C. (248° F.) or higher. In this regard, it is noted that, generally speaking, the higher the softening point of the resin, the greater the tendency for dust formation during handling of the resin particles. For example, as the resin particles cool in the manufacturing process, they become brittle and crumble easily during subsequent handling. This generates copious amounts of air-borne dust, especially during pressurized loading of the material into bags, and dust is also expelled into the air when the bags are unloaded and used. The dusting represents a significant waste of resin and, because the dust is somewhat sticky, the dust tends to cling to the larger particles and the machinery, causing a nuisance and a chronic clean-up problem in the production facility.

One attempt in the art to improve the handling properties of relatively low softening point resin particles which tend to remass or cake during storage is described in U.S. Pat. No. 5,108,680 to Menting et al, which discloses addition of polyethylene hard wax to resins. While addition of polyethylene hard wax may reduce dusting in certain cases, the approach is not entirely satisfactory and the wax is difficult to process in conjunction with rosin and terpene-type resins.

Accordingly, it is an object to the present invention to provide an improved particleized resin and a process for producing the same.

A further object of the present invention is to provide a process for production of particleized resin which reduces the generation of dust during the manufacture of the particles.

An additional object of the present invention is to provide a process for producing particleized resin which exhibits improved properties and characteristics.

Yet another object of the present invention is to provide a process for the production of particleized resin of the character described which is relatively simple and economical.

With regard to the above and other objects, the present invention is directed to a particleized resin composition which exhibits improved properties including, in particular, reduced tendency to fracture and create dust. In accordance with its more general aspects the particleized resin composition comprises a resin selected from the group consisting of rosin, rosin esters, terpene resins and modified forms thereof ("resins") containing a sufficient amount of low density, high molecular weight polyethylene (hereinafter sometimes referred to as "LDHMw polyethylene") to substantially reduce generation of dust during handling of the material. By "low density" it is meant a branched-chain polyethylene which has a density of about 0.925 gm/cm$^3$ or less. By "high molecular weight" it is meant a polyethylene with a relatively high molecular weight of at least about 5,000 or higher. In contrast, polyethylene "hard wax" has a molecular weight well below about 5,000, typically about 2,000 or lower. Unless otherwise noted, the molecular weights given herein are number average molecular weights.

The resin particles may be in any particleized form; e.g., pellets, flakes, chunks, grains, powder or the like, and the LDHMw polyethylene may typically comprise from about 1 to about 20 percent of the particles by weight, and preferably about 5 to 10 weight percent.

The invention is further directed to a method of making resin compositions which exhibit improved properties in particulate form. In general, the method is carried out by mixing LDHMw polyethylene with a resin to provide a resin/polyethylene mixture, preferably by melting and dispersing the polyethylene within molten resin. The mixture is then particleized; i.e., formed into solid particles of the desired shape such as flakes, pellets, granules or the like, by any of the known processes. The particleizing is preferably carried out from the melt as in a pastillator or flaker.

The above and other features and advantages of the present invention will become further known from the following detailed description when considered in conjunction with the accompanying drawing which is a diagrammatic view showing steps in a process for the production of resin particles in accordance with one embodiment of the present invention.

The particleized resin compositions according to the present invention are comprised principally of particles of a resin to which has been added an amount of a LDHMw polyethylene sufficient to substantially reduce dust formation during handling of the resin particles. The LDHMw polyethylene in the particles is preferably a branched chain polyethylene having a molecular weight of about 30,000; a density of about 0.92 gm/cm$^3$; and a melting point of about 105° C. (220° F.). An especially preferred polyethylene is a LDHMw polyethylene available as Product No. 18,189-7 [Cas # 9002- 88-4] from Aldrich Chemical Company, Inc., of Milwaukee, Wis.

The invention is believed to be useful for any resin, particularly those of the natural resin family including gum rosin, wood rosin and tall oil rosin, esterified and modified forms thereof, and other natural resins such as aromatic modified terpene resins and terpene resins as well as any resin, natural or synthetic, which in particleized form exhibits a crumble and generates dust. A preferred resin for treatment in accordance with the present invention is ZONAREZ® 7125, a polyterpene resin [Cas No. 70085-00-6] having a softening point of 125° C. (257° F.) and available from Arizona Chemical Company of Panama City, Fla. While the invention is believed to be applicable to the full range of resins or resin mixtures as previously described, the invention has particular application to resins having a softening point above about 100° C. (212° F.), such as terpene resins for non-food formulations.

The amount of a LDHMw polyethylene needed to sufficiently inhibit dust formation may vary depending on the circumstances. However, it is believed that incorporation of from about 1 to about 20 wt. percent LDHMw polyethylene will sufficiently reduce dust formation for most resins to confer the advantages of the present invention, and that about 10 wt. percent will usually provide sufficient reduction of dusting under typical conditions. There is no known limitation on the upper amount of polyethylene which may be used except practical limitations associated with the cost of the polyethylene and the fact that addition of the polyethylene reduces the amount of resin per unit volume of the composition so that more must be provided to supply given quantities of resin.

With reference to the drawing, steps in one embodiment of a method of producing particleized resin according to the present invention are illustrated in which resin particles are produced from a mixture containing a terpene resin and LDHMw polyethylene. In the illustrated embodiment, the terpene resin (in solid particle form or in a molten state) is metered via conduit 12 and associated valve 14 from a vessel 16 into a tank 18 which is heated, preferably indirectly, as by a submersed heating coil 20 or external heat exchanger, to cause the resin therein to be maintained in an essentially liquid or molten condition. Thus, for a terpene resin having a softening point in the neighborhood of about 125° C. (257° F.) as in the present example, the resin may be maintained at a temperature of from about 200° C. (392° F.) to about 220° C. (428° F.), and most preferably from about 205° C. (401° F.) to about 210° C. (410° F.). This is preferably accomplished in an inert gas atmosphere, such as under a blanket of nitrogen gas.

The liquefied resin is mixed in the tank 18 through the action of stirrer 22 or other suitable mixing device. The LDHMw polyethylene (conventionally supplied in pellet form) enters the tank 18 through conduit 26 leading from polyethylene storage vessel 28, and is metered with feed-screw 29 to provide the desired weight percent of polyethylene in the mixture. The mixture is heated to a temperature of from about 200° C. (392° F.) to about 220° C. (428° F.), preferably about 210° C. (410° F.) (for the preferred LDHMw polyethylene described previously) and maintained at this temperature for a period of time of from a few minutes to about an hour until the polyethylene becomes well dispersed within the resin in the tank 18 in the proportion ultimately desired within the particles. Additional additives, such as antioxidants, may also be added at this point and the mixture cooled to a temperature of from about 195° C. (383° C.) to about 205° C. (401° F.), preferably about 200° C. (392° F.).

The resulting mixture of rosin and LDHMw polyethylene with other desired additives is mixed in the tank 18 until homogenous and then introduced such as by pumping via conduit 30 into an apparatus generally indicated at 32 for particleizing the mixture by any of the known or hereafter known processes to provide resin particles of the desired form; e.g., flakes, chunks, pellets, powder, grains and the like. Such processes include, but are not limited to, flaking on belts or drums, extrusion with comminution, granulation, grating, caking, and any other process for producing divided solids, all of which are referred to herein sometimes as "particleizing." Flaker belts and drums are particularly well-suited for production of particleized resin directly from the melt.

The apparatus 32 of the illustrated embodiment represents a preferred apparatus for particleizing the resin mixture known as a "pastillator". Basically, a pastillator is a machine which feeds drops of molten material onto a moving water-cooled belt which cools and solidifies the drops, and discharges solidified "pastilles" in the form of pellets as the end product.

Thus, in accordance with the present invention, the mixture of rosin, LDHMw polyethylene and optional additives may be fed through conduit 30 to a headbox 34 and emitted from orifices of a head 36 in the form of drops 38 of molten resin, which drop onto a water-cooled steel or Teflon coated fiberglass belt 40 of a conveyor unit 42. On the belt 40, heat is transferred from the drops at a controlled rate causing them to solidify to fairly uniform-sized and shaped particles 44 in the shape of pellets.

The particles or pellets 44 may be discharged from the belt 40 with the assistance of doctor blade 46, and guided by baffle 48 into a container such as a hopper 50. When the solidified particles 44 are to be stored in bags, the hopper 50 may be equipped with a pressurizer as at 52, by which the particles are blown or propelled into bags 54 as in bagging station 56, the bags conventionally having a capacity of about 50 pounds each. The bags 54 are arranged for storage and/or shipment on pallets by stacker unit shown diagrammatically at 58.

Processes for coating the resin particles with various types of polyethylene such as spraying or mixing of polyethylene with resin particles, and comminution of blocks or pieces of polyethylene-containing resin may be used. Again, it has been found that particleized resins provided in accordance with the present invention exhibit considerably improved resistance to crumbling and dust formation. The significantly lower production of dust according to the present invention reduces the cost and nuisance associated with manufacturing waste and cleanup.

The following nonlimiting example further illustrates various features of the invention.

EXAMPLE 1

A mixture of 90 percent resin (ZONAREZ® 7125, a terpene resin having a softening point of 125° C. (257° F.) available from Arizona Chemical Company of Panama City, Fla.) and 10 percent low density, high molecular weight polyethylene (Product No. 18,189-7) available from Aldrich Chemical Company, Inc. of Milwaukee, Wis.) was prepared as follows:

| Time (min.) | Activity |
|---|---|
| 0 | resin introduced in to a flask maintained under a nitrogen atmosphere |
| 30 | flask contents heated to 200° F. |
| 40 | temperature increased to 205° F. and low density, high molecular weight polyethylene added |
| 55 | temperature of flask contents observed to be 200° F., flask contents heated to 220° F. |
| 115 | temperature maintained at 220° F. |
| 145 | temperature at 230° F., all LDHMw polyethylene observed to be in solution with resin, heating stopped. |
| 160 | temperature at 200° F., contents removed |

The contents from the flask were flaked to pellet size (#6 sieve). The pellets were observed to have a softening point of about 110.8° C. (231° F.) and transferred to a 1 pint closed vessel, with the weight recorded. A corresponding sample of resin (ZONAREZ® 7125) pellets not containing any of the LDHMw polyethylene was also prepared by flaking in the same manner and the effect of the addition of the polyethylene was studied by adding four steel ball bearings (each bearing was about 3/8 inch in diameter and weighed about 3.5 grams) to each sample vessel and shaking each vessel for 5 minutes using a standard paint shaker. The contents of each sample vessel were passed through a #60 sieve and the percentage of dust calculated by determining the percent lost after passage through the sieve. The percent dust of the untreated resin was calculated to be 14.9 percent and the percent dust of the resin/LDHMw polyethylene mixture was 4.1 percent. The addition of 10 percent LLHMw polyethylene was thus observed to reduce dust formation of particleized resin by 72 percent ((14.9 - 4.1)/14.9 =72 percent). The softening point of the treated sample was observed to be 110.8° F. and the softening point of the untreated resin was 126.2° F.

EXAMPLE 2

A mixture of 90 percent ZONAREZ® 7125 and 10 percent polyethylene hard wax (Grade A-C® 6, available from Allied Signal Inc., Morristown, N.J.) was prepared as follows:

| Time (min) | Activity |
|---|---|
| 0 | resin introduced into a flask maintained under a nitrogen atmosphere |
| 30 | flask contents heated to 200° F. |
| 40 | temperature increased to 205° F. and polyethylene hard wax added |
| 60 | flask contents at 200° F., all in solution, and contents removed |

The contents of the flask were flaked to pellet size in the same manner as in Example 1 (#6 sieve). The pellets were transferred to a 1 pint closed vessel, with the weight recorded. Four steel ball bearings (each bearing was about 3/8 inch in diameter and weighed about 3.5 grams) were added to the sample vessel and the vessel was shaken for 5 minutes using a standard paint shaker. The contents of the sample vessel were passed through a #60 sieve and the percentage of dust calculated by determining the percent lost after passage through the sieve. The percent dust of the resin/polyethylene hard wax mixture was 9.9 percent. The addition of 10 percent polyethylene hard wax was thus observed to reduce dust formation of particleized resin by 33 percent ((14.9 - 9.9)/14.9=33 percent). As noted in Example 1, resin treated in accordance with the present invention reduced dust formation by 72 percent. The softening point of the resin/wax sample was observed to be 104.9° F.

Accordingly, treatment by adding low density, high molecular weight polyethylene in accordance with the invention suppressed dust formation much more effectively than polyethylene hard wax while producing a significantly higher softening point. It was unexpected to find that the dust formation was suppressed to such a greater degree while the softening point was higher. This indicates that the invention results in a more stable product which is also less likely to block during storage, providing a double benefit as compared to prior products.

The foregoing description of preferred embodiments of the present invention has been provided for purposes of illustration only, and it is understood that numerous modifications, substitutions and alterations may be made without departing from the spirit and scope of the invention as defined in the following claims.

What is claimed:

1. A composition of matter comprising discrete particles principally containing a resin selected from the group consisting of rosin, rosin esters, terpene resins and modified forms thereof each of said particles having dispersed therein from about 1 to about 20 wt. percent low density, high molecular weight polyethylene to substantially reduce generation of dust during handling of the particles as compared to conventional particleized resin particles not having polyethylene incorporated therein.

2. The composition of claim 1, wherein the polyethylene has a number average molecular weight of at least about 30,000.

3. The composition of claim 1, wherein the resin has a softening point of at least about 120° C.

4. The composition of claim 1, wherein the resin particles are in the form of flakes, pellets or powder.

5. The composition of claim 1, wherein the polyethylene is a branched claim polyethylene having a density of about 0.925 gm/cm$^3$ or less.

6. A method of making particleized resin which comprises mixing low density, high molecular weight polyethylene with a resin selected from the group consisting of rosin, rosin esters, terpene resins and modified forms thereof to provide a resin/polyethylene mixture and particleizing the resin/polyethylene mixture to provide resin particles which exhibit substantially reduced generation of dust during handling thereof as compared to untreated resin.

7. The method of claim 6, wherein the particles comprise about 1 to 20 weight percent polyethylene.

8. The method of claim 7, wherein the resin has a softening point of at least about 120° C.

9. A particleized resin made according to the method of claim 7.

10. A composition of matter consisting essentially of discrete particles each of which comprises a resin selected from the group consisting of rosin esters, terpene resins and modified forms thereof and from about 1 to about 20 percent low density, high molecular weight polyethylene by weight dispersed within the resin.

11. The composition of claim 10, wherein the polyethylene has a number average molecular weight of at least about 30,000.

12. The composition of claim 10, wherein the resin has a softening point of at least about 120° C.

13. A composition of matter comprising discrete particles each of which contains resin selected from the group consisting of rosin, rosin esters, terpene resins and modified forms thereof and from about 1 to about 20 percent by weight of a low density polyethylene having a number average molecular weight of at least about 30,000.

14. The composition of claim 12, wherein the resin has a softening point of at least about 120° C.

15. A composition of matter comprising particles each of which consists essentially of resin selected from the group consisting of rosin, rosin esters, terpene resins and modified forms thereof having a softening point of at least about 120° C. and from about 1 to about 20 percent by weight of a polyethylene having a number average molecular weight of at least about 5,000 and a density of about 0.925 gm/cm$^3$ or less.

* * * * *

UNITED STATES PATENT AND TRADEMARK OFFICE
CERTIFICATE OF CORRECTION

PATENT NO : 5,959,010
DATED : September 28, 1999
INVENTOR(S): Robert W. Schluenz It is certified that error appears in the above-identified patent and that said Letters Patent is hereby corrected as shown below:

In Column 2, lines 27-31, delete "when considered in conjunction with the accompanying drawing which is a diagrammatic view showing steps in a process for the production of resin particles in accordance with one embodiment of the present invention".

In Column 3, line 7, delete "With reference to the drawing, steps" and insert --Steps--.

In Column 3, line 9, after "present invention", delete "are illustrated in which" and insert --will now be described with respect to--.

In Column 3, line 9, after "particles" delete "are".

In Column 3, line 11, after "In" delete "the illustrated" and insert --this--.

In Column 3, line 13, after "metered" delete "via conduit 12 and associated valve 14"

In Column 3, lines 13 and 14, after "vessel" delete "16".

In Column 3, line 14, after "tank" delete "18".

In Column 3, line 15, after "coil" delete "20".

In Column 3, line 25, after "tank", delete "18".

In Column 3, line 26, after "action of" insert --a--; and after "stirrer" delete "22".

In Column 3, line 28, after "tank" delete "18 through conduit 26 leading"; and after "from" insert --a--.

In Column 3, line 29, after "vessel", delete "28"; after "with" insert --a--.

In Column 3, lines 29-30 after "feedscrew" delete "29".

In Column 3, line 37, after "tank" delete "18".

In Column 3, line 44, after "tank" delete "18".

In Column 3, lines 45 and 46, after "introduced" delete "such as by pumping via conduit 30".

UNITED STATES PATENT AND TRADEMARK OFFICE
CERTIFICATE OF CORRECTION

PATENT NO : 5,959,010
DATED : September 28, 1999
INVENTOR(S) : Robert W. Schluenz It is certified that error appears in the above-identified patent and that said Letters Patent is hereby corrected as shown below:

In Column 3, line 46, after "apparatus" delete "generally indicated at 32".
In Column 3, lines 57-58, delete "The apparatus 32 of the illustrated embodiment represents a" and insert --A--.
In Column 3, line 66, after "fed" delete "through conduit 30".
In Column 3, line 66, delete "34".
In Column 3, line 67, after "head" delete "36"; and after "drops" delete "38".
In Column 4, line 2, after "belt" delete "40" and after "unit" delete "42".
In Column 4, line 3, after "belt" delete "40".
In Column 4, line 5, after "particles" delete "44".
In Column 4, line 6, after "pellets" delete "44".
In Column 4, line 7, after "belt" delete "40".
In Column 4, line 7, after "of" insert --a--; after "blade" delete "46".
In Column 4, lines 7-8, after "by" insert --a--; and after "baffle" delete "48".
In Column 4, line 8, delete "50".
In Column 4, line 9, after "particles" delete "44" and after "hopper" delete "50".
In Column 4, line 10, after "pressurizer" delete "as at 52".
In Column 4, line 11, after "bags" delete "54"; after "in" add --a--.
In Column 4, line 12, after "station" delete "56".
In Column 4, line 13, after "bags" delete "54".
In Column 4, line 14, after "by" add --a--.
In Column 4, lines 14-15, delete "unit shown diagrammatically at 58".
In Column 5, line 4, after "110.8°" delete "F" and add --C--.
In Column 5, line 5, after "126.2°" delete "F" and add --C--.

UNITED STATES PATENT AND TRADEMARK OFFICE
CERTIFICATE OF CORRECTION

PATENT NO. : 5,959,010
DATED : September 28, 1999
INVENTOR(S) : Robert W. Schluenz It is certified that error appears in the above-identified patent and that said Letters Patent is hereby corrected as shown below:

<u>In the Claims</u>:

In Claim 5, line 15, after "branched" delete "claim" and add --chain--.
In Claim 9, line 30, after "claim" delete "7" and add --6--.

Signed and Sealed this

Sixth Day of June, 2000

Attest:

Q. TODD DICKINSON

*Attesting Officer*          *Director of Patents and Trademarks*